United States Patent Office 3,497,457
Patented Feb. 24, 1970

3,497,457
STABILIZED ORGANIC HALOGEN PRECURSORS FOR POLYURETHANE FOAMS
Ronald James Hurlock and Raymond Joseph Marklow, Manchester, Robert Leslie McGinty, Runcorn, and Raymond Price and John Francis Wood, Manchester, England, assignors to Imperial Chemical Industries Limited, London, England, a corporation of Great Britain
No Drawing. Filed Jan. 25, 1967, Ser. No. 611,562
Claims priority, application Great Britain, Jan. 27, 1966, 3,755/66
Int. Cl. C08g 22/14, 51/58
U.S. Cl. 252—182                       1 Claim

ABSTRACT OF THE DISCLOSURE

A stabilized composition comprising 100 parts by weight of an organic polyol and up to 100 parts by weight of an organic halogen compound, and, as stabilizer, from 0.01% to 10% by weight, based on the weight of the organic halogen compound, of a substance possessing antioxident and/or metal-complexing properties.

---

This invention relates to compositions of matter and more particularly to stabilised compositions containing organic halogen compounds useful in the manufacture of polyurethane foams.

The manufacture of polyurethane foams by the reaction or organic polyisocyanates with polyols in the presence of gas-generating agents and other optional additives such as catalysts, surface active agents, cross-linking agents and fire retardants is well-established commercial practice. The foam-forming reaction takes place following the bringing together, usually at a mixing head or spray gun, of the organic polyisocyanate and the isocyanate-reactive materials, particularly the polyol. The number of ingredients in a foam-forming reaction mixture may quite commonly be five and frequently there may be as many as eight or more. In order to reduce the number of component streams supplied to the mixing head or spray gun it is conventional to prepare blends of some of the ingredients. These premixes may contain two or three components only or in some cases they may contain all of the ingredients of the reaction mixture other than the polyisocyanate. It is quite common to prepare substantial quantities of these premixes to be stored until required. It is often found, however, that those premixes which contain organic halogen compounds undergo changes during storage. The organic halogen compounds which may be present include, in particular, blowing agents and flame-proofing agents. When such compounds are present, crystalline deposits can form in the premixes in a relatively short period of time. This is undesirable because of the possibility of the crystalline material causing blockages in the filters, lines, pumps and jets associated with the polyurethane foam mixing apparatus. Even more important it is frequently found that the storage of these premixes results in the production of inferior foams. These changes are particularly marked when the premixes are in contact with metals, especially copper. It has now been found that these difficulties may be obviated or minimised by the inclusion in the premix of an antioxidant or metal complexing agent.

Accordingly, the present invention provides a stabilised composition comprising an organic halogen compound and one or more of the components used in conjunction with organic polyisocyanates in the manufacture of polyurethane foams, and, as stabiliser, from 0.01% to 10% by weight, based on the weight of the organic halogen compound, of a substance possessing antioxidant and/or metal-complexing properties.

The organic halogen compound is an organic compound containing one or more halogen atoms in the molecule. The advantages of the present invention are most fully realised when at least one halogen atom is attached to an aliphatic carbon atom. Of particular importance are halogenated hydrocarbons, having boiling points not exceeding 75° C. at atmospheric pressure. Such compounds are frequently employed as blowing agents in polyurethane foam formulations because of their ability to vaporise rapidly under the influence of the exothermic polyurethane-forming reaction. Examples of such compounds include methylene chloride, vinylidene chloride and particularly fluorinated hydrocarbons such as trichlorofluoromethane, dichlorodifluoromethane, dichloromonofluoromethane, monochlorodifluoromethane, dichlorotetrafluoroethane, 1,1,2-trichloro-1,2,2-trifluoroethane, dibromodifluoromethane and monobromotrifluoroethane.

Other organic halogen compounds which may be present include carbon tetrachloride, ethylene dichloride, ethylene dibromide, trichloroethylene and compounds having boiling points in excess of 150° C. at atmospheric pressure such as are commonly employed as flame-proofing agents in polyurethane foam formulations. Such compounds include tris-2-chloroethyl phosphate, tris - chloropropyl phosphate, tris - 2,3 - dibromopropyl phosphate and 2,3-dibromoproanol.

A mixture of organic halogen compounds may be present in the stabilised composition of the present invention, for example a mixture of a blowing agent and a flame-proofing agent.

The component present together with the organic halogen compound in the stabilised composition of the present invention may be any of the materials other than an organic polyisocyanate, proposed as components of polyurethane foam-forming reaction mixtures. Of particular importance are compositions containing an organic halogen compound and a polyol or a tertiary amine or a mixture thereof. Such compositions are frequently made up as premixes for use in polyurethane foam manufacture but the stability of such compositions has hitherto been a cause for concern.

Polyols that may be present in the stabilised compositions of the present invention include low molecular weight polyols of the type employed as cross-linking agents in polyurethane foam formulations. Examples of such compounds include ethylene glycol, diethylene glycol, 1,4-butanediol, triethanolamine, glycerol and trimethylolpropane. Other polyols that may be present in addition to or instead of the aforesaid low molecular weight compounds are polyols of higher molecular weight, for example greater than 250, usually employed as the principal isocyanate-reactive materials in polyurethane foam formulations.

Polyols having molecular weights of at least 250 are well-known and methods for their preparation are fully described in the prior art. Particularly suitable for use in the stabilised compositions of the present invention are polyols prepared by the reaction of one or more alkylene oxides with a compound containing a plurality of active hydrogen atoms. Suitable alkylene oxides include ethylene oxide, epichlorohydrin, 1,2-propylene oxide, 1,2-butylene oxide and 2,3-butylene oxide. Mixtures of two or more oxides may be used if desired, or, as a further variant, the active hydrogen-containing compound may be reacted with two or more alkylene oxides in successive stages, for example using propylene oxide in the first stage and ethylene oxide in the second. Compounds containing a plurality of active hydrogen atoms with which the alkylene oxides may be reacted include water, ammonia, hydrazine, cyanuric acid, polyhydroxy compounds, for example ethylene glycol, propylene glycol, diethylene glycol, glycerol, trimethylolpropane, triethanolamine, pentaerythritol, sorbitol, sucrose, phenolformaldehyde reaction products, resorcinol, and phloroglucinol, aminoalcohols, for example monoethanolamine and diethanolamine, polyamines, for example ethylene diamine, hexamethylene diamine, tolylene diamine and diaminodiphenylmethane and polycarboxylic acids, for example adipic acid, terephthalic acid and trimesic acid. The conditions for the reaction between the alkylene oxide and the active hydrogen containing compound may be those fully described in the prior art using, for example, basic catalysts such as potassium hydroxide or acidic catalysts such as boron trifluoride. The reaction products may have molecular weights of from 250 to 8000 according to the amount of alkylene oxide reacted with the active hydrogen-containing compound.

Other polyols which may be included in the stabilised compositions of the present invention include polyester-polyols.

Suitable polyester polyols may be made, for example from dicarboxylic acids and polyhydric alcohols. Suitable dicarboxylic acids include succinic, glutaric, adipic, suberic, azelaic, and sebacic acids as well as aromatic acids such as phthalic, isophthalic and terephthalic acids. Mixtures of acids may be used. Examples of polyhydric alcohols include glycols such as ethylene glycol, diethylene glycol, tetramethylene glycol, pentamethylene glycol, hexamethylene glycol, decamethylene glycol and 2,2-dimethyltrimethylene glycol. Mixtures of glycols may be used and other polyhydric alcohols such as trimethylolpropane, pentaerythritol or glycerol, may be included in varying amounts, or used alone according to the desired properties of the products. The polyesters may contain amide groups introduced by including a proportion of diamine or aminoalcohol in the polyester-forming reaction mixtures. Suitable diamines and aminoalcohols include ethylene diamine, hexamethylene diamine, tolylene diamine and ethanolamine. The polyesters suitably have molecular weights between 250 and 6000.

Compositions of particular usefulness are those containing a polyol having from three to eight hydroxyl groups per molecule and a hydroxyl value of from 200 to 750 mg. KOH/g. In particular there may be mentioned polyols having from three to eight hydroxyl groups per molecule and molecular weights of from 75 to 150 units for each hydroxyl group. Such compositions are of particular usefulness in the manufacture of rigid polyurethane foams.

Particularly suitable compositions in accordance with the present invention are mixtures containing up to 100 and preferably from 20 to 70 parts by weight of organic halogen compound for each 100 parts by weight of polyol.

The superior stability of the compositions of the present invention compared with corresponding compositions which do not contain an antioxidant or a metal-complexing agent is particularly marked when the compositions contain a basic-reacting material. The basic-reacting material may be an impurity, for example the residue of an alkaline catalyst used in the reaction between an alkylene oxide and an active hydrogen-containing compound. On the other hand the basic-reacting material may be a deliberately added component of the stabilised composition such as a tertiary amine to be used as a catalyst in a polyurethane formulation. Moreover, the polyol itself may have a basic reaction due to the presence therein of primary, secondary or tertiary amino groups.

It is common practice to employ tertiary amines as catalysts in polyurethane foam formulations and also to employ isocyanate-reactive tertiary amines, such as triethanolamine and tetrakis-2-hydroxypropyl ethylene diamine, as cross-linking agents. Since the amines are used in relatively small quantities it is convenient to blend them with the polyol before forming the final reaction mixture. Unfortunately, it has hitherto been found that the presence of tertiary amines in polyols which also contain organic halogen compounds, for example trichlorofluoromethane, aggravates the stability difficulties referred to herein.

Tertiary amines that may be present in the stabilised compositions of the present invention include, in particular those types that have already been proposed as catalysts for polyurethane processes. Thus there may be mentioned triethylamine, dimethylethylamine, dimethylbenzylamine, dimethylcyclohexylamine, dimethylphenylethylamine, tetramethyl-1,3-butanediamine, triethylene diamine, N-alkylmorpholines, N-alkylpyrrolidines, N-alkylpiperidines, pyrrolizidine, N-(2-dimethylaminoethyl)-N'-methylpiperazine, 1,1'-dimethyl-4,4'-bipiperidyl and dimethylaminopyridine. In some cases the polyol itself may contain one or more tertiary amino residues, for example, it may be triethanolamine or a reaction product of propylene oxide with triethanolamine or tolylene diamine.

Mention may also be made of other components, conventional to polyurethane foam formulations, that may be present in the stabilised compositions of the present invention. Such components include water frequently employed as a blowing agent, organic metal compounds employed as catalysts, for example stannous octoate, dibutyltin dilaurate and lead octoate and surface active agents, for example siloxane-oxyalkylene copolymers and oxyethylated alkyl phenols.

The material employed as stabiliser for the stabilised compositions of the present invention may be any substance possessing antioxidant and/or metal complexing properties. Thus, there may be used compounds known as conventional antioxidants or metal-complexing agents whilst many compounds, such as dithiocarbamates, are common to both of these classes.

Suitable antioxidants are those compounds which are already known as antioxidants for use in foodstuffs, in natural and synthetic rubbers, in lubricating oils and in polymers such as the polyolefines. Many compounds of this kind are already well known in the art. Among numerous publications in which such compounds are described there may be mentioned "Autoxydation, Mesures de Prevention, Antioxydants" by M. Vigneron, "Rubber Chemicals" by J. van Alphen (Elsevier Publishing Company, 1956) and "Atmospheric Oxidation and Antioxidants" by G. Scott (Elsevier Publishing Company, 1965).

Particularly suitable for use as antioxidants in the process of the present invention are compounds of the following classes:

(i) Polyhydric phenols, for example pyrogallol and esters of gallic acid;

(ii) Substituted monohydric phenols, particularly alkyl-cycloalkyl-, aralkyl-, aryl-, and alkoxy- substituted phenols, for example 2-(α - methylcyclohexy) - 4,6 - dimethylphenol; 2,6-di-t-butyl-4-methylphenol; 4 - methyl-2,6 - di(hydroxymethyl)phenol and 2,6 - di-t-butyl - 4-methoxyphenol;

(iii) Polyphenols such as bis-phenols, for example bis-(2 - hydroxy - 3 - (α-methylcyclohexyl) - 5 - methylphenyl)methane, 1,1 - bis - (2 - hydroxy-3,5-dimethylphenyl) - 1 - octylmethane and bis - (3-t-butyl-2-hydroxy- 5 - methylphenyl)methane; trisphenols, for example, 1,1,
3 - tris - (5 - t - butyl - 4-hydroxy-2-methylphenyl)butane;
tetrakis phenols, for example 1,1,5,5-tetrakis-(5-t-butyl-
4-hydroxy-2-methylphenyl)pentane;

(iv) Sulphides, for example dilaurylthiodipropionate, dioctyl sulphide and magnesium calcium or barium salts of thiodipropionic acid;

(v) Dithiocarbamates such as sodium diethyldithiocarbamate, zinc diethyldithiocarbamate, zinc dinonyldithiocarbamate, 2,6 - bis - (piperidinothiocarbonylthiomethyl) - 4 - methylphenol and 2,6-di-t-butyl-4-diethylthiocarbamoylthiomethylphenol;

(vi) Dialkyldithiophosphates such as zinc dinonyldithiophosphate and zinc, magnesium or barium diisopropyldithiophosphate;

(vii) Aromatic amines, for example N,N'-di(β-naphthyl)-p-phenylene diamine, condensates of diphenylamine and acetone;

(viii) Phosphites or thiophosphites, for example, triphenyl, tricresyl and trixylyl phosphites or trilauryltrithiophosphite;

(ix) Tetraalkyl thiuram disulphides, for example tetraethylthiuram disulphide.

Antioxidants which have been found to be particularly useful for the stabilisation of the compositions of the present invention include 2(α-methylcyclohexyl)-4,6-dimethylphenol, bis(2 - hydroxy - 3 - (α-methylcyclohexyl)-5-methylphenyl) methane, triphenyl phosphite, and tetraethyl thiuram disulphide.

If desired, mixtures of antioxidants may be used and it is sometimes an advantage to do so. For example there may be used synergistic combinations of a phenol and a sulphur containing compound such as a mixture of dilaurylthiodipropinate with the condensate of crotonaldehyde and 2-t-butyl-5-methylphenol. It is also advantageous in many cases to use an antioxidant in conjuction with an acid acceptor such as an epoxide, or sodium acetate.

Some of the above compounds, in addition to having antioxidant properties, are known to have metal complexing properties. Examples of other metal complexing agents which may be used include 2-mercaptobenzimidazole and derivatives such as 7-amino-2-mercaptobenzimidazole, 5,6-dichloro - 2 - mercaptobenzimidazole, bis(2-mercaptobenzimidazole-5-yl) sulphone, benzotriazole and derivatives such as 5-nitrobenzotriazole, 2-mercaptobenzothiazole and derivatives and other compounds containing the

grouping. Other suitable compounds include salts of xanthic acid, for example sodium, potassium, ammonium and quaternary ammonium salts, biguanide and substituted biguanides, dithiooxamide, salts of tartaric acid and citric acid, ethylene diamine tetra-acetic acid and related compounds, salicylaldoxime, Schiff's bases from salicylaldehyde and diamines, 8-hydroxyquinoline and amino acids such as glycine.

Metal-complexing agents which have been found to be particularly suitable include in particular 2-mercaptobenzimidazole and its derivatives.

Mixtures of metal-complexing agents may be used if desired and also mixtures containing a metal-complexing agent and an antioxidant.

It is preferred to use from 0.05% to 5.0% of stabilising agent based on the weight of the organic halogen compound.

The stabilised compositions of the present invention may be prepared by simply mixing the ingredients preferably with the aid of efficient agitation so as to ensure uniformity. It is often convenient first to mix the stabilising agent with the organic halogen compound and then to combine this mixture with the polyol or other polyurethane ingredient as necessary.

The superior storage stability of the compositions of the present invention compared with compositions which do not contain the stabilisers described herein may be demonstrated in a number of ways. In many cases the effect is visual, crystals being deposited in the unprotected compositions at a much greater rate than in the stabilised compositions. The differences are often particularly marked when metals are present either as such or in ionic form, for example if a metal vessel is employed. Thus, in the presence of copper, unprotected compositions rapidly assume a blue colour; this effect is retarded to a remarkable extent by the use of the stabilisers of the present invention particularly compounds such as 2-mercaptobenzimidazole. Differences between unprotected and stabilised compositions after storage may also become apparent in the foam-forming reaction and in the properties of the derived foams, the unprotected compositions being slower reacting. For purposes of comparison the differences can be shown quite simply by determining the ionisable halogen contents of the compositions.

Whilst the effect of the stabilisers described herein is fully evident in the absence of metals, it is particularly important when metals are present as is usually the case in commercial practice. Stabilisation is important in the presence of copper and its alloys such as brass and Monel metal but protection is also required in the case of iron and aluminium. The stabilisers described herein provide this stabilisation to a remarkable degree.

The stabilised compositions of the present invention may be used in the manufacture of polyurethane foams together with organic polyisocyanates and other conventional ingredients of polyurethane foam formulations using the general methods fully described in the prior art. Organic polyisocyanates which may be used include tolylene diisocyanate and diphenylmethane diisocyanate both of which may be employed in purified or crude forms.

The invention is illustrated but not limited by the following examples in which all parts and percentages are by weight.

EXAMPLE 1

A mixture of 800 parts of an oxypropylated triethanolamine (molecular weight approximately 390) and 120 parts of triethanolamine is prepared and to portions of 57.5 parts each is added 0.28 part of stabiliser followed by 25 parts of trichlorofluoromethane. The samples are stored in the dark in glass bottles; their storage characteristics are given below:

| Additive | Deposition of of crystals | Percent ionisable chlorine After 6 weeks | After 10 week |
|---|---|---|---|
| None | Within 2 weeks | 0.23 | 0.26 |
| Tetraethyl thiuram disulphide | None within 10 weeks | 0.021 | 0.021 |
| 2-α-methylcyclohexyl-4,6-dimethylphenol | Between 6 to 10 weeks | 0.054 | 0.135 |
| Mixture of above | None within 10 weeks | 0.016 | 0.02 |

(Ionic chlorine determinations in presence of sulphur containing additives tend to be over-estimated).

EXAMPLE 2

As Example 1 but replacing oxypropylated triethanolamine by an oxypropylated trimethylolpropane of similar hydroxy value.

| Additive | Deposition of crystals | Percent ionisable chlorine | |
|---|---|---|---|
| | | After 6 weeks | After 10 weeks |
| None | Within 2 weeks | 0.086 | 0.091 |
| Tetraethyl thiuram disulphide | None after 10 weeks | 0.033 | 0.019 |
| 2-α-methylcyclohexyl-4,6-dimethylphenol | do | 0.002 | 0.019 |
| Mixture of above | do | 0.005 | 0.023 |

EXAMPLE 3

A blend of ingredients for the manufacture of rigid urethane foam that may be termed formulation A is prepared as follows—

Formulation A: Parts
Oxypropylated trimethylolpropane (hydroxyl value 540 mg. KOH/g.) _____ 100
Triethanolamine _____ 15
Water _____ 2
Diazabicyclooctane _____ 1
Trichlorofluoromethane _____ 60

The triethanolamine is a "commercial" grade containing 10 parts of diethanolamine for each 100 parts of triethanolamine.

A further formulation (Formulation B) is prepared from formulation A as follows—

Formulation B: Parts
Formulation A _____ 178
2-mercaptobenzimidazole _____ 0.15

Portions of Formulations A and B are stored in glass bottles in the dark and treated as follows:

| | | |
|---|---|---|
| Bottle No. 1 | Formulation A | No treatment. |
| Bottle No. 2 | Formulation B | Do. |
| Bottle No. 3 | Formulation A | Plus piece of bright copper foil. |
| Bottle No. 4 | Formulation B | Do. |
| Bottle No. 5 | Formulation A | Plus 0.00125 part of copper sulphate per 100 parts by weight of formulation. |
| Bottle No. 6 | Formulation B | Do. |

The formulations are examined at intervals and the "ionisable chlorine" determined by titration with silver nitrate.

| | After 2 days | | After 3 weeks | |
|---|---|---|---|---|
| Bottle No. | Percent ionisable chlorine | Appearance | Percent ionisable chlorine | Appearance |
| 1 | <0.01 | Clear | <0.01 | Clear. |
| 2 | 0.02 | do | 0.02 | Do. |
| 3 | 0.66 | Heavy deposit | >1 | Heavy deposit. |
| 4 | 0.02 | Slight deposit | 0.09 | Slight deposit. |
| 5 | 0.56 | Heavy deposit | >1 | Heavy deposit. |
| 6 | 0.02 | Clear | 0.02 | Clear. |

The superior stability of Formulation B, containing 2-mercaptobenzimidazole, in the presence of metallic copper and copper ions is clearly demonstrated.

EXAMPLE 4

A blend of ingredients for rigid urethane foam that may be termed Formulation C is prepared as follows—

Formulation C: Parts
Oxypropylated triethanolamine (hydroxy value 520 mg. KOH/g.) _____ 60
Oxypropylated tolylene diamine (hydroxyl value 480 mg. KOH/g. _____ 40
Water _____ 2
N,N-dimethylcyclohexylamine _____ 1
Tris(2-chloroethyl)phosphate _____ 30
Trichlorofluoromethane _____ 65

A further formulation, Formulation D) is prepared from Formulation C as follow—

Formulation D: Parts
Formulation C _____ 198
2-mercaptobenzimidazole _____ 0.15

Portions of Formulations C and D are stored in glass bottles in the dark and treated as follows:

| | | |
|---|---|---|
| Bottle No. 7 | Formulation C | No treatment. |
| Bottle No. 8 | Formulation D | Do. |
| Bottle No. 9 | Formulation C | Plus piece of bright copper foil. |
| Bottle No. 10 | Formulation D | Do. |

The formulations are examined at intervals and the "ionisable chlorine" content determined by titration with silver nitrate.

| | Percent ionisable chlorine | |
|---|---|---|
| | After 1 week | After 3 weeks |
| Bottle No.: | | |
| 7 | 0 | 0.02 |
| 8 | 0.01 | 0.02 |
| 9 | 0.03 | 0.11 |
| 10 | 0.01 | 0.03 |

EXAMPLE 5

A blend of ingredients for the manufacture of rigid urethane foam that may be termed Formulation E is prepared as follows—

Formulation E: Parts
Oxypropylated triethanolamine (hydroxyl value 510 mg. KOH/g.) _____ 100
Water _____ 2
Triethanolamine _____ 10
Trichlorofluoromethane _____ 60

A further formulation (Formulation F) is prepared as follows—

Formulation F: Parts
Formulation E _____ 172
2-mercaptobenzimidazole _____ 0.15

Portions of Formulations E and F are stored in glass bottles in the dark and treated as follows:

| | | |
|---|---|---|
| Bottle No. 11 | Formulation E | No treatment. |
| Bottle No. 12 | do | Plus 0.015 parts of ferrous ammonium sulphate and 0.022 part of ferric alum. |
| Bottle No. 13 | Formulation F | No treatment. |
| Bottle No. 14 | do | Plus 0.015 part of ferrous ammonium sulphate and 0.022 part of ferric alum. |

The formulations are examined at intervals and the "ionisable chlorine" content determined by titration with silver nitrate.

| | Percent ionisable chlorine | |
|---|---|---|
| | After 7 days | After 14 days |
| Bottle No.: | | |
| 11 | 0.08 | 0.12 |
| 12 | 0.24 | 0.34 |
| 13 | 0.01 | 0.02 |
| 14 | 0.01 | 0.02 |

The effect of ionic iron on an unprotected composition and the stabilisation provided by the 2-mercaptobenzimidazole are clearly demonstrated.

EXAMPLE 6

A blend of ingredients for rigid urethane foams that may be termed Formulation G is—

Formulation G: Parts
Oxypropylated trimethylolpropane (hydroxyl value 520 mg. KOH/g.) _____ 100
Water _____ 2
Triethanolamine _____ 15
N,N-dimethylcyclohexylamine _____ 2
Trichlorofluoromethane _____ 50

To portions of Formulation G comprising 169 parts by weight are added 0.15 part of various compounds containing the mercaptoimidazole group. The blends are further divided into two portions and stored in the dark in glass bottles. A piece of copper is placed in one of the two portions and the ionisable chlorine determined after 5 days with results as shown in the following table:

| Additive | Ionisable chlorine, percent | |
|---|---|---|
| | No copper | Copper |
| None | <0.01 | 0.12 |
| 7-amino-2-mercaptobenzimidazole | 0.02 | 0.02 |
| 5,6-dichloro-2-mercaptobenzimidazole | 0.01 | 0.02 |
| Bis(2-mercaptobenzimidazol-5-yl) sulphone | 0.02 | 0.01 |

EXAMPLE 7

A blend of ingredients for rigid urethane foam that may be termed Formulation H is—

Formulation H: Parts
Oxypropylated triethanolamine (hydroxyl value 450 mg. KOH/g.) _____ 100
Water _____ 2
N,N-dimethylcyclohexylamine _____ 1.5
1,1,2-trichloro-1,2,2,-trifluoroethane _____ 40

A further formulation (Formulation I) is prepared from Formulation H as follows—

Formulation I: Parts
Formulation H _____ 143
2-mercaptobenzimidazole _____ 0.15

Portions of Formulations H and I are stored in glass bottles in the dark and treated as shown in the table. The ionisable chlorine content of each bottle is determined.

| | | Percent ionisable chlorine after 7 days |
|---|---|---|
| Bottle No. 15 | Formulation H no treatment | 0.04 |
| Bottle No. 16 | Formulation I no treatment | 0.02 |
| Bottle No. 17 | Formulation H plus piece of bright copper foil | 0.10 |
| Bottle No. 18 | Formulation I plus piece of bright copper foil | 0.02 |

EXAMPLE 8

The composition of Example 1 is stored in the dark, in the presence of a sheet of copper foil, with the following additives (0.28 part for each 25 parts of trichlorofluoromethane) and the time for the appearance of crystals is noted.

Additive: Time for crystals
None _____ In 4 days.
Zinc N-ethyl-N-phenyl dithiocarbamate _____ In 16 days.
Zinc diethyl dithiocarbamate _____ In 9 days.
2-mercaptobenzimidazole _____ None in 36 days.
2-mercaptobenzthiazole _____ Do.
Salicylaldoxime _____ In 36 days.
Bis(2 - hydroxy - 3 - (α - methylcyclohexyl)-5 - methylphenyl) methane _____ In 16 days.
Benzotriazole _____ Within 36 days.

EXAMPLE 9

The composition of Example 1 is stored in the dark with additives as listed below in amounts of 1% and 0.2% based on the weight of trichlorofluoromethane.

| | Percent ionisable chlorine after— | | | |
|---|---|---|---|---|
| | 4 weeks | | 6 weeks | |
| | 1.0% Agent | 0.2% Agent | 1.0% Agent | 0.2% Agent |
| Additive | (Crystals) | | (Crystals) | |
| (1) None | 0.15% | | 0.216% | |
| (2) Zinc diisopropyldithiophosphate | 0.018 | 0.060 | | |
| (3) Bis(hydroxymethyl)p-cresol | 0.017 | 0.027 | | |
| (4) Dilaurylthiodipropionate | 0.033 | [1] 0.056 | | |
| (5) 2,6-di-t-butyl-4-diethylthiocarbamoylthiomethylphenol | 0.023 | [1] 0.10 | | |
| (6) Trilauryltrithiophosphite | 0.063 | 0.16 | | |
| (7) 2-α-Methylcyclohexyl-4,6-dimethylphenol | 0.048 | 0.053 | 0.078 | 0.12 |
| (8) Bis(2-hydroxy-3-(α-methyl-cyclohexyl)-5-methylphenyl)methane | 0.019 | 0.025 | 0.030 | 0.038 |
| (9) Condensate of 2, 4 and 2, 5-xylenol and butaldehyde | 0.037 | 0.061 | 0.062 | [1] 0.18 |
| (10) 1, 1-bis-(2-hydroxy-3, 5-dimethylphenyl)-1-octyl methane | 0.031 | 0.061 | 0.023 | [1] 0.24 |
| (11) 2-tertbutyl-4, 6-dimethylphenol | 0.05 | 0.05 | 0.096 | 0.065 |
| (12) N, N'-di-(β-naphthyl)-p-phenylenediamine | 0.009 | 0.022 | | 0.017 |
| (13) Condensate of acetone and diphenylamine | 0.020 | 0.026 | 0.025 | 0.030 |
| (14) Zinc dinonyldithiophosphate | 0.043 | 0.089 | 0.048 | [1] 0.19 |
| (15) Triphenyl phosphite | 0.026 | 0.021 | 0.028 | 0.032 |
| (16) Zinc diethyldithiocarbamate | 0.022 | 0.031 | 0.044 | 0.036 |
| (17) Zinc N-ethyl-N-phenyldithiocarbamate | 0.027 | 0.059 | 0.039 | [1] 0.16 |
| (18) Tetraethylthiuramdisulphide | 0.026 | 0.042 | 0.039 | 0.043 |
| (19) Mixture of equal parts (7) and (15) | 0.036 | 0.047 | 0.031 | 0.036 |
| (20) Mixture of equal parts (7) and (16) | 0.016 | 0.038 | 0.029 | 0.059 |

[1] Crystals.

EXAMPLE 10

Compositions containing 47 parts of oxypropylated trimethylolpropane (hydroxyl value 520 mg. KOH/g.) and 20 parts of trichlorofluoromethane are stored, in the presence of 0.2 part of the additives stated below, for several days at 60° C. and then for a number of days at 80° C. The ionisable chlorine contents of the compositions are then determined.

| Additive | Days at 60° C. | Days at 80° C. | Percent ionisable chlorine |
|---|---|---|---|
| None | 14 | 6 | 1.51 |
| Do | None | 7 | 0.39 |
| Tetraethyl thiuram disulphide | 16 | 13 | 0.035 |
| Triphenyl phosphite | 14 | 13 | 0.011 |
| 1,1-bis(2-hydroxy-3,5-dimethylphenyl)-1-octylmethane | 10 | 13 | 0.013 |
| 2-α-methylcyclohexyl-4,6-dimethylphenol | 10 | 13 | 0.018 |
| N,N'-di(β-naphthyl)-p-phenylenediamine | 7 | 13 | 0.006 |

EXAMPLE 11

A composition containing 47 parts of oxypropylated sorbitol (hydroxyl value 500 mg. KOH/g.), 20 parts of trichlorofluoromethane and 0.2 part of tetraethyl thiuram disulphide is stored for 16 days at 60° C. and then for 13 days at 80° C. after which time the ionisable chlorine content of the mixture is 0.032%.

An identical composition from which the tetraethyl thiuram disulphide is omitted is stored for 14 days at 60° C. and then for 5 days at 80° C. and is then found to have an ionisable chlorine content of 0.54%.

EXAMPLE 12

A blend of ingredients for the manufacture of foam is prepared as follows:

| | |
|---|---|
| Bis(diethylene glycol)adipate | 15 |
| Ethylene glycol | 1 |
| Potassium acetate | 1 |
| Siloxane-oxyalkylene copolymer | 2 |
| N,N-dimethylcyclohexylamine | 0.5 |
| Trichlorofluoromethane | 10 |
| 2-mercaptobenzimidazole | 0.1 |

This blend is stored in the presence of copper and remains clear for at least one week. In a corresponding blend from which the mercaptobenzimidazole is omitted, a blue colour and crystals are formed within a few days in the presence of copper.

We claim:
1. A stabilized composition consisting essentially of:
  (a) 100 parts by weight of an organic polyol selected from the group consisting of
    (1) a polyol having a molecular weight below 250;
    (2) a polyol which is the reaction product of alkylene oxide with a compound containing from 2–8 active hydrogen atoms, said reaction product having a molecular weight ranging from 250 to 8000; and
    (3) a polyester polyol which is the reaction product of a dicarboxylic acid and a polyhydric alcohol, said polyester polyol having a molecular weight ranging from 250 to 6000;
  (b) up to 100 parts of an organic halogen compound selected from the group consisting of a halogenated hydrocarbon having a boiling point not exceeding 75° C. at atmospheric pressure and tris-2-chloroethyl phosphate; and
  (c) from 0.01% to 10% weight, based on the weight of the organic halogen compound of a stabilizer selected from the group consisting of 2-(α-methylcyclohexyl)-4,6-dimethylphenol, bis(2-hydroxy-3-(α-methylcyclohexyl)-5-methylphenyl)methane, triphenyl phosphite, tetraethyl thiuram disulphide, 2-mercaptobenzimidazole, 7-amino-2-mercaptobenzimidazole, 5,6-dichloro-2-mercaptobenzimidazole and bis-(2-mercaptobenzimidazol-5-yl)sulphone.

References Cited

UNITED STATES PATENTS

| | | | |
|---|---|---|---|
| 2,669,507 | 2/1954 | Young | 252—406 X |
| 3,290,376 | 12/1966 | Chenieek et al. | 252—401 X |
| 3,355,482 | 11/1967 | Coover et al. | 252—406 X |
| 3,409,587 | 11/1968 | Mills | 252—406 X |
| 3,006,870 | 10/1961 | Steinfatt et al. | |
| 3,201,358 | 8/1965 | Hostettler et al. | |
| 3,378,497 | 4/1968 | Lanham | 252—182 |

FOREIGN PATENTS 1,191,565   4/1965   Germany.

LEON D. ROSDOL, Primary Examiner

I. GLUCK, Assistant Examiner

U.S. Cl. X.R.

252—400, 401, 402 404, 406; 260—2.5, 45.9, 45.85, 45.95